US006975083B2

(12) United States Patent
Flock

(10) Patent No.: US 6,975,083 B2
(45) Date of Patent: Dec. 13, 2005

(54) CONTROL FOR A HALF-BRIDGE

(75) Inventor: Horst Flock, Reutlingen (DE)

(73) Assignee: Alcoa Fujikura Gesellschaft mit beschraenkter Haftung, Frickenhausen (DE)

(*) Notice: Subject to any disclaimer, the term of this patent is extended or adjusted under 35 U.S.C. 154(b) by 0 days.

(21) Appl. No.: 10/687,155

(22) Filed: Oct. 16, 2003

(65) Prior Publication Data

US 2004/0119429 A1 Jun. 24, 2004

Related U.S. Application Data

(63) Continuation of application No. PCT/EP02/04171, filed on Apr. 16, 2002.

(30) Foreign Application Priority Data

Apr. 27, 2001 (DE) ................................ 101 20 705

(51) Int. Cl.[7] .............................. H02P 5/06; H02P 7/06

(52) U.S. Cl. ...................... 318/254; 318/800; 318/806; 318/439; 388/907.2

(58) Field of Search ........................ 318/254, 811, 801, 318/800, 806, 439; 361/23, 33, 90, 91.1; 363/15–17, 363/21.1, 21.11, 21.18, 27, 41, 56.02, 69, 363/70, 71, 74, 123, 124, 131, 132, 134–136; 388/907.2

(56) References Cited

U.S. PATENT DOCUMENTS 4,901,366 A * 2/1990 Rottger ....................... 388/811
5,335,029 A * 8/1994 Itoh et al. ................... 396/311
5,386,182 A * 1/1995 Nikami ....................... 318/293
5,764,006 A 6/1998 Amanuma et al.
5,886,484 A * 3/1999 Fucili et al. ................ 318/254
6,066,930 A * 5/2000 Horiguchi et al. .......... 318/439
6,232,731 B1 * 5/2001 Chapman .................... 318/801
6,269,014 B1 7/2001 Sander et al.
6,534,937 B2 * 3/2003 Genova et al. ............. 318/254
6,611,117 B1 * 8/2003 Hardt ......................... 318/254

FOREIGN PATENT DOCUMENTS

DE 199 35 100 3/2001
EP 0 373 693 6/1990

OTHER PUBLICATIONS

*Control Integrated Circuit Designers' Manual*, IR211—Half-Bridge Driver, 1996, pp. B39-B45.

* cited by examiner

*Primary Examiner*—David Martin
*Assistant Examiner*—Patrick Miller
(74) *Attorney, Agent, or Firm*—Lipsitz & McAllister LLC

(57) ABSTRACT

A control circuit, processor and half-bridge are provided for operating electric motors. The half-bridge includes a first electronic switch lying between a supply voltage and a phase tap, and a second electronic switch lying between the phase tap and ground. The control circuit is adapted to control the first and second electronic switches with one out of only three switching signal pairings. The signal pairings consist of (i) the first switch being on and the second switch being off, (ii) the first switch being off and the second switch being on, and (iii) the first and second switches being off The processor has a signal output port coupled to control the control circuit to select one of the three signal pairings, via one of three possible output signals at the signal output port.

17 Claims, 7 Drawing Sheets

FIG.4

| 36 | 66 | 70 | S1 | S2 | 18 |
|---|---|---|---|---|---|
| H | L | L | L | H | Ground |
| L | H | H | H | L | Uv |
| T | L | H | L | L | Off |

FIG.6

| 36 | 66 | 70 | S1 | S2 | 18 |
|---|---|---|---|---|---|
| H | L | L | L | H | Ground |
| L | H | H | H | L | $U_V$ |
| T | L | H | L | L | Off |

CONTROL FOR A HALF-BRIDGE

The present disclosure relates to the subject matter disclosed in PCT application No. PCT/EP02/04171 of Apr. 16, 2002, which is incorporated herein by reference in its entirety and for all purposes.

BACKGROUND OF THE INVENTION

The invention relates to a control for a half-bridge, in particular for operating electric motors, which comprises a first electronic switch, lying between a supply voltage and a phase tap, and a second electronic switch, lying between the phase tap and ground, the control having a control circuit, which controls the two electronic switches of the half-bridge with switching signals, and a processor, which controls the control circuit with at least one signal output.

Controls of this type are known from the prior art. With them, the processor usually has a signal output for each of the electronic switches, which controls said switch.

The problem of these solutions is that two signal outputs of the processor are required for each half-bridge.

It is therefore an object of the invention to improve the control of the generic type in such a way that it is of a more simple construction.

SUMMARY OF THE INVENTION

This object is achieved in the case of a control of the type described at the beginning according to the invention by providing that both of the electronic switches of the half-bridge can be controlled with the control circuit by a single signal output of the processor, that only three switching signal pairings for the two electronic switches can be produced with the control circuit, that is to say first switch on and second switch off or first switch off and second switch on or first and second switches off, and that the control circuit always controls the switches with only one of the three switching signal pairings.

The advantage of the solution according to the invention can be seen in the fact that the control circuit requires control only by a single signal output of the processor and, what is more, ensures increased functional reliability, that is to say by said circuit allowing only three switching signal pairings, which all ensure that the critical switching signal pairing, with which both electronic switches are switched on and consequently a short-circuit occurs between the supply voltage and ground, cannot occur at any point in time.

Consequently, the control according to the invention has not only the advantage that it requires only a single signal output of the processor, but at the same time the advantage that it allows only switching signal pairings which exclude the critical short-circuit state from the outset, and consequently ensures increased operating reliability.

The control according to the invention is not only advantageous for two half-bridges which are used for controlling a DC motor with a change of direction, but particularly advantageous for operating electronically commutated motors, for example in the manner of three-phase motors, which necessitates at least three half-bridges.

In particular, the control according to the invention is no longer susceptible to any type of programming or functional errors of the processor, as was the case with the prior art in which two signal outputs of the processor were used, since, in the case of the solutions known from the prior art, it was always possible for external or internal errors to bring about the case in which the two signal outputs were occupied by signal states which led to both electronic switches being switched on, even if this only took place for a short time.

With respect to the possibility of being able to control all three switching signal pairings in a specifically directed manner with the one signal output, a wide variety of possibilities are conceivable. A particularly advantageous solution provides that at the signal output connected to the control circuit there is either a “high” signal state or a “low” signal state, or a “tristate” signal state, the potential of which can set itself freely.

With these three signal states, the control circuit of the control according to the invention is capable of producing the three required switching signal pairings for operating the electronic switches of the half-bridge.

A particularly simple solution provides in this respect that the signal output of the processor connected to the control circuit is either at the feed voltage of the latter or at ground, or allows free potential setting, the free potential setting corresponding to the “tristate” signal state, while the “high” signal state corresponds to the feed voltage and the “low” signal state corresponds to ground.

To achieve greatest possible reliability for defining the only three permitted switching signal pairings, it is preferably provided that, for defining the only three switching signal pairings, the control circuit comprises a not freely programmable stage. The not freely programmable stage makes a unique definition of the switching signal pairings possible independently of all program errors or control errors.

This can be realized in a particularly simple way by the stage having hard-wired components, which consequently always “enforce” one of the three switching signal pairings.

Furthermore, it is particularly advantageous for reasons of reliable operation if the control circuit comprises a not freely programmable stage which establishes fixed associations between the signal pairings and the switching states at the signal output, that is to say that not only are the switching signal pairings themselves uniquely defined but the association of the same with the signal states also cannot be disturbed by program errors or other malfunctions.

In this case too, it is particularly advantageous if the stage has hard-wired components.

With regard to the type of construction of the control circuit, a wide variety of possibilities are conceivable.

For instance, a preferred solution provides that the control circuit has two complementary stages which can be controlled by the signal output of the processor and which make it possible in a simple way to correlate the signal states at the signal output uniquely with the switching signal pairings provided. Particularly simple control of the complementary stages can be achieved by the latter being connected to the signal output via resistors of equal size.

In principle, it would be conceivable to control the electronic switches already with the stages coupled to the signal output.

For reasons concerning the most optimum possible function, it is advantageous if the control circuit has a driver circuit for each of the electronic switches.

This driver circuit preferably merely converts states at control inputs of the stage enforcing the switching signal pairings, and consequently does not necessarily have to be designed in such a way that it only permits the three switching signal pairings.

The electronic switches are usually FET transistors, with which a freewheeling diode is connected in parallel for protection. However, such freewheeling diodes that are already fitted into the transistors have a relatively high breakdown voltage, which leads to considerable heat generation in the event of breakdown.

For this reason, it is preferably provided that, in event of the feed voltage at the processor breaking down, the control circuit produces the switching signal pairing with which the first switch is switched off and the second switch is switched on, so that connecting of the phase tap to ground always takes place, and consequently for example braking of the motor operated with this half-bridge always takes place.

This represents a further function ensuring the reliability of the control according to the invention.

Furthermore, a particularly advantageous configuration of the control according to the invention provides that, with the "tristate" signal state at the signal output of the processor, the control circuit produces the switching signal pairing with which the first and second switches are switched off.

This solution has the great advantage that, for example, with a "reset signal" for the processor, the "tristate" switching state occurs and, as a result, switches off the control of the load via the phase tap.

A particularly advantageous solution which is optimized in particular with regard to the switching reliability of the half-bridge provides that the control circuit is formed in such a way that, with the "tristate" signal state at the signal output of the processor, it automatically sets a potential that lies between those of the "high" and "low" signal states.

This solution has the particularly great advantage that, even when switching over the signal output of the processor from the "high" signal state to the "low" signal state or, conversely, from the "low" signal state to the "high" signal state, a potential which the control circuit recognizes as the "tristate" signal state is always passed through, so that, with the transition from the switching signal pairing corresponding to the "low" signal state to the switching signal pairing corresponding to the "high" signal state, the control circuit always goes over in the first instance into the switching signal pairing corresponding to the "tristate" switching state, which switches off both the first switch and the second switch, so that a short-circuit through the half-bridge cannot be produced at any time by one switch not switching off in time before the other switch switches on, since before the switching on of one of the switches of the two switches are always preemptively switched off by the "tristate" signal state.

In addition, it is particularly advantageous if the driver circuit of the second electronic switch automatically switches the second electronic switch into the freewheeling state if this is required on account of the inductance of the load and the switching off of the first switch. This solution has the great advantage that it is not necessary to use the freewheeling diode integrated into the second electronic switch, but instead there is the possibility of actively turning on the second electronic switch of the half-bridge for the freewheeling state.

In addition, the object according to the invention is also achieved by a control device for a load fed via phase taps of at least two half-bridges, the invention providing that each of the half-bridges can be controlled with a control of its own according to one of the preceding claims and each of the control circuits can respectively be controlled by a signal output associated with the latter of a common processor.

The advantage of this solution is that each processor has a dedicated signal output for each control, which then controls the corresponding control circuits, so that only one processor and two control circuits are required in the case of a DC motor and one processor and three or more control circuits are required in the case of an electronically commutated motor, for example in the manner of a three-phase motor.

This control device can also be operated particularly advantageously whenever the half-bridges are controllable in their power by pulse-width modulation operation of at least one of the electronic switches of the half-bridges respectively to be switched on.

That is to say that, during the customary time during which corresponding electronic switches would be turned on, a reduction in the power fed in is possible by use of pulse-width-modulated switching signals, for example with a pulse-width modulation ratio in the range from 0% to 100%.

In principle, it would be conceivable in the case of the pulse width modulation to operate both the first electronic switch of the corresponding half-bridge and the second electronic switch of the corresponding other half-bridge simultaneously and synchronously clocked with the corresponding switching signals in pulse-width modulation operation.

However, it has proven to be particularly advantageous if, in pulse-width modulation operation, the first electronic switch of one of the half-bridges can be operated in a pulse-width modulated manner and a corresponding second electronic switch of another half-bridge is constantly turned on during the pulse-width modulation operation, so that only the corresponding first electronic switch in each case has to be operated in pulse-width modulation operation, while the other, second electronic switch respectively remains constantly switched on during the pulse-width modulation operation.

Further features and advantages of this solution according to the invention are the subject of the description which follows and of the graphic representation of some exemplary embodiments.

BRIEF DESCRIPTION OF THE DRAWINGS

FIG. 4 shows a diagram of the combination of the signal states at the signal output of the processor with switching signal pairings for the half-bridge;

FIG. 6 shows a diagram of a combination of signal states at the signal output of the processor with switching signal pairings for the half-bridge and FIG. 7 shows a diagram of a way of operating the control device according to FIG. 1 with pulse-width-modulated control of the half-bridges.

DETAILED DESCRIPTION OF THE INVENTION

Figure 1:
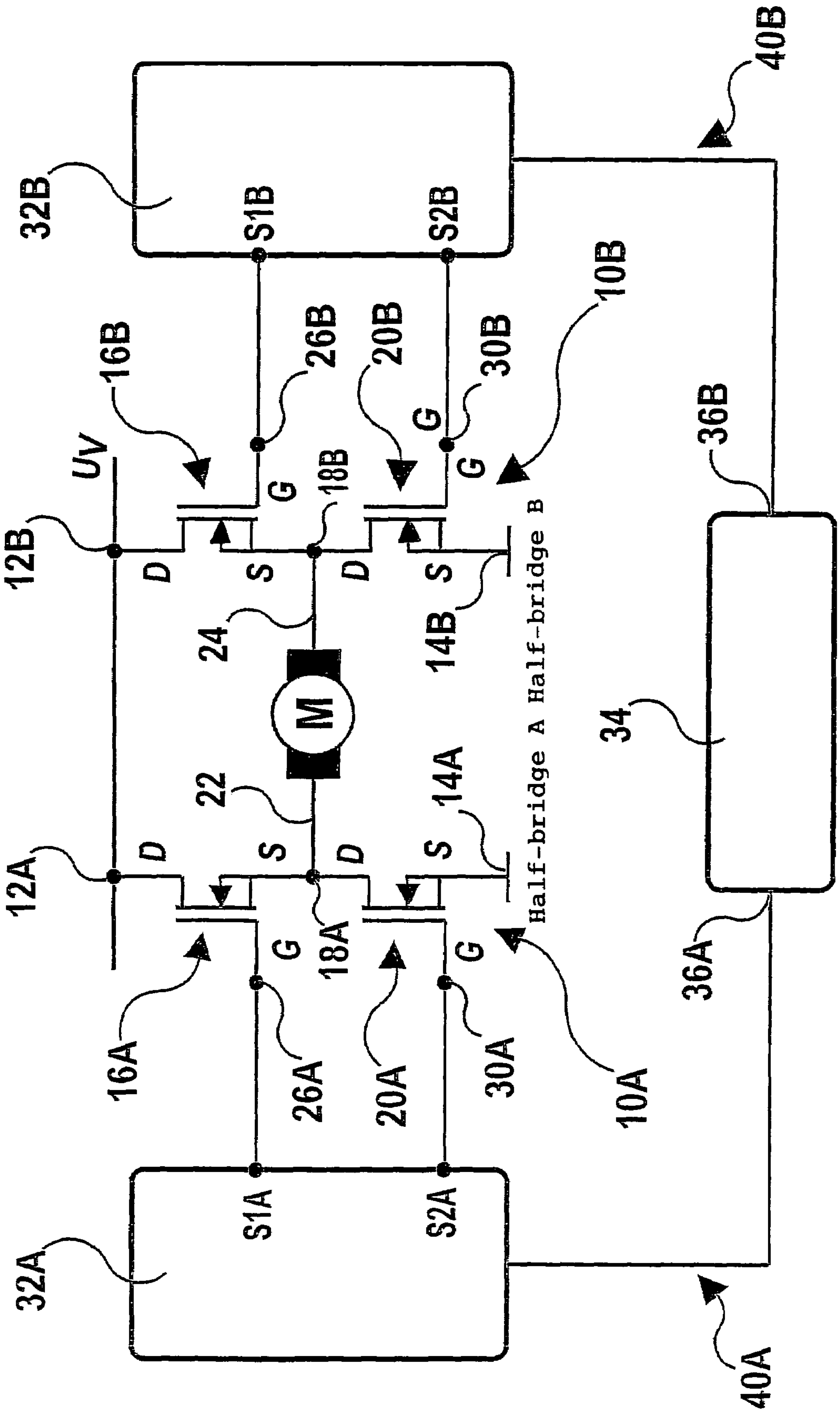
FIG. 1 shows a control device for a DC motor with two half-bridges controlled in a way according to the invention.

A circuit diagram, represented in FIG. 1, of a control device for operating a DC motor M with changing direction of rotation comprises two half-bridges 10A and 10B, which on the one hand have a feed terminal 12A and 12B, respectively, and are connected by the latter to a supply voltage UV and on the other hand have a ground terminal 14A and 14B, respectively, and are connected via the latter to ground.

Each of the half-bridges 10A and 10B has for its part a first electronic switch 16A and 16B, respectively, for example an FET transistor, which is connected by its drain terminal D directly to the respective supply terminal 12A or 12B and is connected by its source S to a center tap 18A or 18B of the respective half-bridge 10A or 10B.

Between the center tap 18A and 18B and the ground terminal 14A and 14B there lies a second electronic switch 20A and 20B, respectively, for example likewise an FET transistor, which is once again connected by its drain terminal to the center tap 18A and 18B, respectively, and by its source terminal S to the ground terminal 14A and 14B, respectively.

The center taps 18A and 18B represent phase terminals for the DC motor M, one connecting lead 22 of the DC motor M being led to the center tap 18A and the other connecting lead 24 of the DC motor being led to the center tap 18B.

The electronic switches 16A and 20A and, respectively, 16B and 20B of each of the half-bridges 10A and 20B have control terminals 26A and 30A and, respectively, 26B and 30B connected to the respective gate G, the control terminals 26A and 30A and, respectively, 26B and 30B of each of the half-bridges 10A and 10B being connected to a dedicated control circuit 32A and 32B, respectively.

The control circuit 32A in this case generates the switching signals S1A and S2A for the electronic switches 16A and 20A of the half-bridge 10A, while the control circuit 32B generates the switching signals S1B and S2B for the electronic switches 16B and 20B of the half-bridge 10B.

With the control device according to FIG. 1, the DC motor M can then be controlled in two directions of rotation, that is to say on the one hand by turning on the first electronic switch 16A of the half-bridge 10A and the second electronic switch 20B of the half-bridge 10B in one direction of rotation, and in the opposite direction of rotation by turning on the first electronic switch 16B of the half-bridge 10B and the second electronic switch 20A of the half-bridge 10A, the other electronic switches in each case not being turned on.

What is more, the DC motor M can be shut down if all the electronic switches 16A and 20A and also 16B and 20B are not turned on.

In the case of the present invention, each of the control circuits 32A and 32B can consequently be controlled by the same processor 34, but by different signal outputs 36A and 36B of the same processor 34.

Each of the control circuits 32A and 32B consequently forms together with the processor 34 a control 40A and 40B for the respective half-bridge 10A and 10B.

Figure 2:
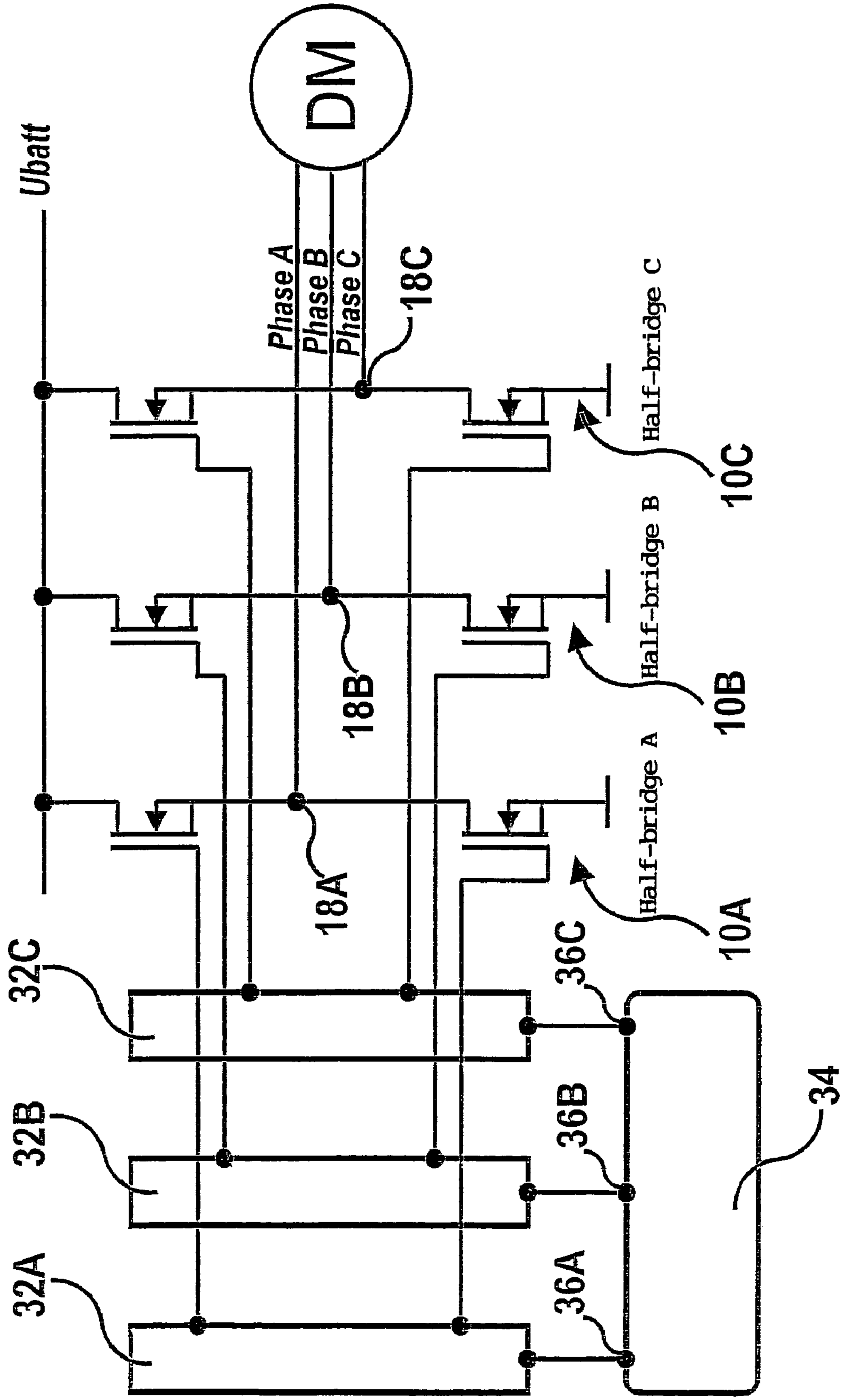
FIG. 2 shows a control device for an electrically commutated motor with three half-bridges controlled in a way according to the invention.

However, the half-bridges can be used not only, as represented in the circuit diagram in FIG. 1, for controlling the DC motor M, but, as represented in FIG. 2, in a control device for controlling an electronically commutated motor DM, with in this case not two half-bridges but instead three such half-bridges 10A, 10B and 10C being provided, the half-bridges 10A to 10C being constructed in a way identical to the half-bridges 10A and 10B in the case of the circuit diagram according to FIG. 1.

The center tap 18A or 18B or 18C of the respective half-bridges 10A and 10B and 10C provides in each case one of the phases for the electronically commutated motor DM.

Each of the half-bridges 10A to 10C is consequently connected for its part to a control circuit 32A and 32B and 32C, respectively, and each of these control circuits interacts with the processor 34, with the processor 34 in this case having three signal outputs 36A and 36B and 36C, respectively.

Depending on the control of the half-bridges 10A, 10B and 10C by the processor 34 via the respective control circuits 32A, 32B and 32C, the rotational speed and direction of rotation of the electronically commutated motor DM can be controlled in a known way.

Figure 3:
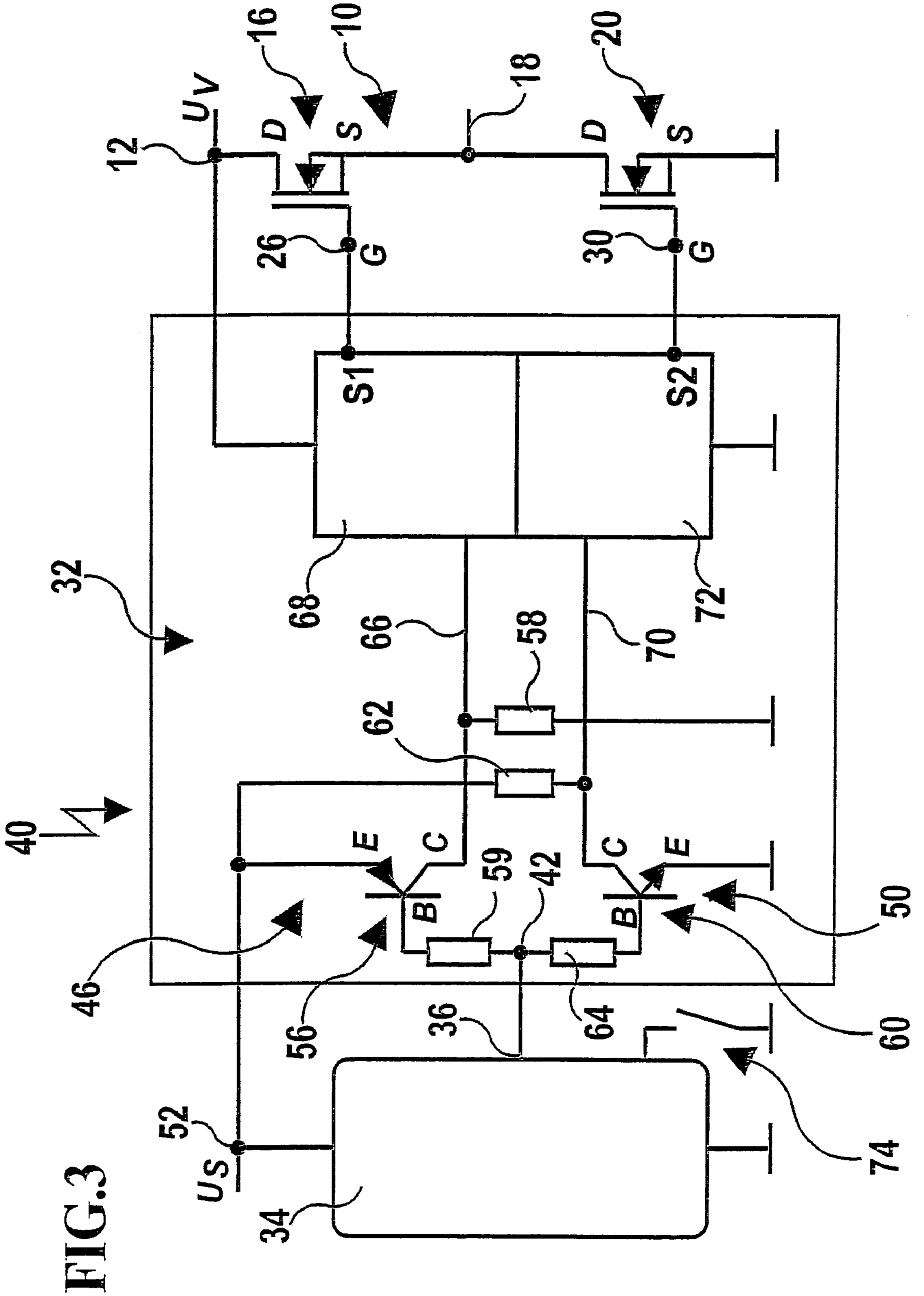
FIG. 3 shows a first exemplary embodiment of a control according to the invention of a half-bridge.

The first exemplary embodiment of a control 40 according to the invention is represented in FIG. 3.

Apart from the processor 34, this comprises the control circuit 32 for controlling the electronic switches 16 and 20 of the half-bridge 10.

For this purpose, the signal output 36 of the processor 34, which serves alone for the controlling of the control circuit 32 and consequently of the half-bridge 10, is connected to a common control input 42 of two complementary control stages 46 and 50.

The control stage 46 in this case comprises a PNP transistor 56, the emitter E of which is connected to a feed voltage terminal 52 of the processor 34, at which the voltage US is present, while the collector C of the transistor 56 is at ground via a resistor 58.

Furthermore, the base of the transistor 56 is connected via a resistor 59 to the control input 42.

Furthermore, the second control stage 50 comprises an NPN transistor 60, the emitter of which is connected to ground, while the collector C is connected via a resistor 62 to the feed voltage terminal 52 and the base B is connected via a resistor 64 to the control input 42.

The first control stage 46 consequently has a control output 66 which is connected to the collector C of the transistor 56 and controls a driver circuit 68, which for its part once again generates the switching signal S1 for controlling the first electronic switch 16.

Furthermore, the second control stage 50 has a control output 70, which is connected to the collector of the transistor 60 and via which the control of a driver circuit 72 takes place, which for its part generates the switching signal S2 for the second electronic switch 20.

In the case of the first exemplary embodiment of the control 40 according to the invention for the half-bridge 10, the processor 34 is formed in such a way that a total of three switching states can be produced at the signal output 36, that is to say a first signal state with which the signal output 36 is at "high", a second signal state with which the signal output is at "low" and a third signal state with which the signal output has no defined potential, but is switched internally in the processor 34 to the "tristate" state, that is to say is switched as an input of the processor 34 and consequently sets itself to the potential which is produced by the external wiring of the signal output 36.

These three signal states have the following effects in the control circuit 32. In the case of the first signal state, in which the signal output 36 lies at "high", the transistor 56 of the first control stage 46 turns off, which leads to the control output 36 being at ground on account of the effect of the resistor 58.

On the other hand, the transistor 60 of the second control stage 50 turns on, so that the control output 70 of the second control stage 50 is likewise at "low", that is to say at ground.

The driver stage 68 is then formed in such a way that, whenever the "low" state is present at the control output 66, the switching signal S1=0 is generated and consequently the first electronic switch 16 is turned off.

If the "low" state is likewise present at the control output 70, the driver circuit 72 generates the switching signal S2="high" and consequently turns on the second electronic switch 20, so that the center tap 18 of the half-bridge 10 is actively switched to ground.

If, on the other hand, the "low" state is present at the signal output 36, this leads to the transistor 56 of the first control stage 46 and the transistor 60 of the second control stage 50 being respectively turned on, so that the "high" state is present at the control output 66, since the transistor 56 establishes a direct connection with the feed voltage terminal 52 and, on the other hand, the "high" state is likewise present at the control output 70, since the transistor 60 of the second control stage 50 turns off and consequently the control output 70 likewise lies at the voltage of the feed voltage terminal 52, via the resistor 62.

As a result of the driver circuit 68 being formed in a corresponding way, the "high" state at the control output 66 leads to this driver circuit generating the switching signal S1="high" and consequently turning on the first electronic switch 16, while the driver circuit 72 with the "high" state at the control output 70 generates the switching signal S2="low" and consequently does not turn on the second electronic switch 20. Consequently, the center tap 18 is actively switched at the supply voltage UV.

If, on the other hand, the signal output 36 switches to the "tristate" state, this does not predetermine any potential, but instead the potential can set itself in a way corresponding to the external wiring of the signal output 36.

On account of the fact that the resistors 59 and 64 are of the same size and, what is more, the base-emitter voltages of the transistor 56 and 60 are likewise approximately equal in size, a potential which corresponds exactly to half the voltage US sets itself at the control input 42.

This leads to the transistor 56 of the first control stage 46 turning on and consequently the "high" state being present at the control output 66, which in turn leads to the driver circuit 68 generating the switching signal S=0.

Furthermore, in the "tristate" state, the transistor 60 of the second control stage 50 is likewise turned on, so that the control output 70 has the "low" state and consequently the driver circuit 72 generates the switching signal S2= 0.

That is to say that the "tristate" signal state at the signal output 36 leads to both control switches 16 and 20 turning off.

The advantage of the first exemplary embodiment of the control circuit 32 according to the invention for the half-bridge 10 can be seen in that the three signal states "high", "low" and "tristate" at the signal output 36 have compulsorily associated switching signal pairings, that is to say S1=0 and S2=1 and, respectively, S2=0 and S1=1 and, respectively, S1=0 and S2=0, so that at no point in time can the half-bridge 10 be miscontrolled to the extent that both the first electronic switch 16 and the second electronic switch 20 are turned on, but at most one of the electronic switches 16 and 20 is turned on.

In addition, the control circuit 32 according to the invention as provided by the first exemplary embodiment has the advantage that, with the transition from the "high" switching state to the "low" switching state at the signal output or from the "low" switching state to the "high" switching state, a voltage US/2 is always passed through at the signal output 36, and consequently the signal input 42 is switched to US/2, which is identical to the "tristate" switching state, so that both electronic switches 16 and 20 are preemptively switched off, that is to say that, with the transition from a state in which one of the electronic switches 16 or 20 is switched on and the other switched off to a state in which the other of the electronic switches 20, 16 is switched on and the other switched off, a state in which both electronic switches 16 and 20 are at least switched off for a short time is always passed through, so that as a result complete switching-off of the half-bridge 10 always takes place for a short time, and consequently at no time can a state occur in which both the first electronic switch 16 and the second electronic switch 20 are switched on—even if for only such a short time.

In addition, the first exemplary embodiment of the circuit according to the invention also has the further advantage that, when the feed voltage US breaks down at the feed voltage terminal 52, both the control output 66 and the control output 70 are in the "low" state, which has the consequence that the second electronic switch 20 is turned on and consequently the center tap 18 is always at ground, which in the case of an electric motor would lead to braking of the same.

Finally, the control circuit 32 according to the invention also has the further advantage that, when a reset switch 74 of the processor 34 is actuated, the signal output 36 always goes over into the "tristate" state, which leads to both electronic switches 16 and 20 also always being switched off in the state of a reset of the processor 34.

For purposes of illustration, the table according to FIG. 4 summarizes how the switching states at the signal output 36 are associated with the individual switching signal pairings of the switching signals S1 and S2.

Figure 5:
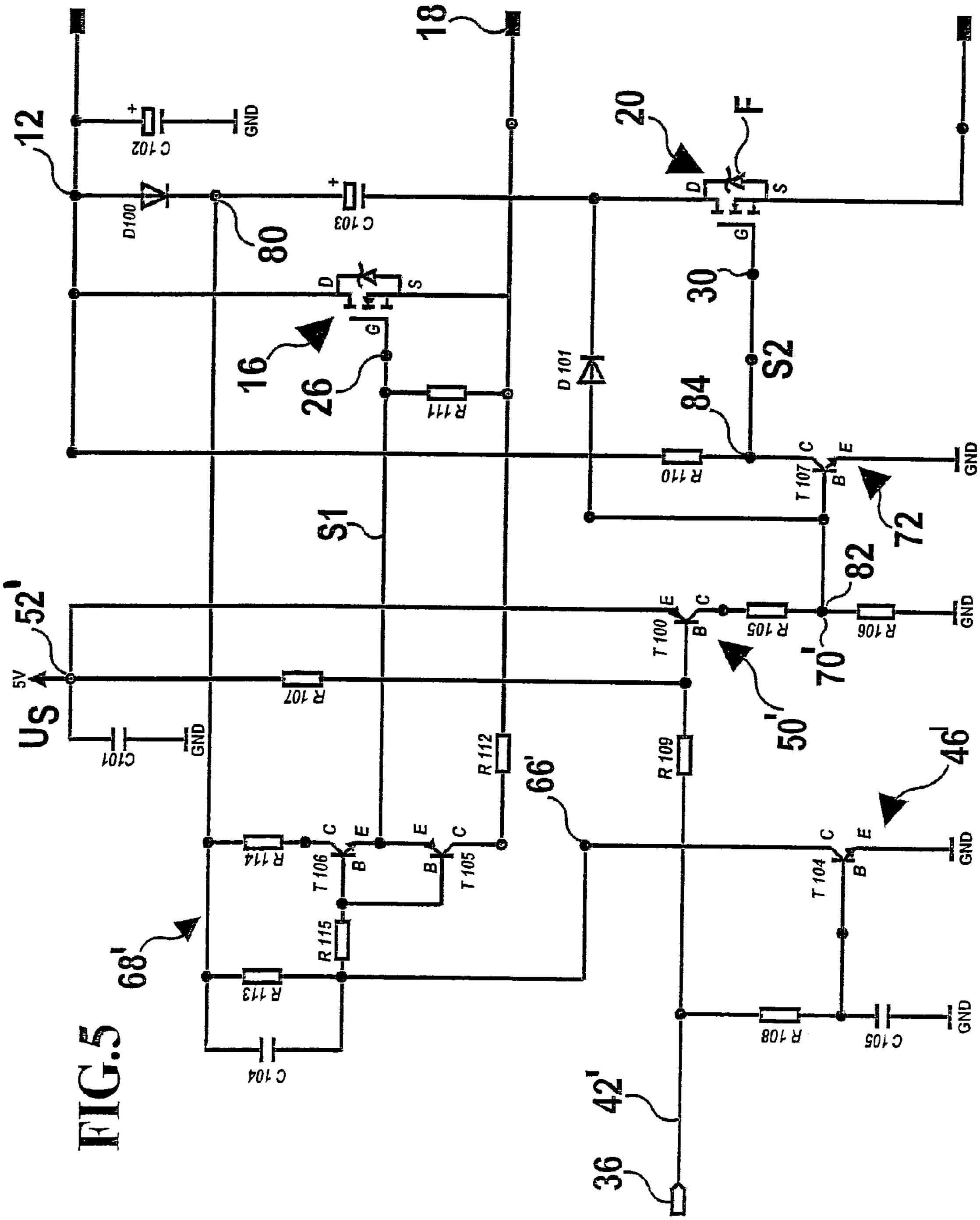
FIG. 5 shows a second exemplary embodiment of a control according to the invention of a half-bridge.

In the case of a second exemplary embodiment of a control circuit 32' according to the invention, represented in FIG. 5, a discrete construction of the complete control circuit 32' with the driver circuit is represented, but not the processor 34, but instead only its signal output 36.

The signal output 36 is connected in the same way as in the case of the first exemplary embodiment to the control input 42', via which it is possible to control a first control stage 46', the transistor T104 of which is connected with its base B via a resistor R108 to the control input 42' and with its emitter E to ground.

The collector T104 also controls the first driver circuit 68', which comprises the transistors T105 and T106, which for their part generate the switching signal S1, in order to control the gate G of the first electronic switch 16 via the control terminal 26.

In order to have adequately high voltages available for switching on, the first driver circuit comprises a diode D100 and a capacitor C103, which are connected in series between the supply terminal 12 and the center tap 18 and have a center tap 80, at which there is a high voltage after switching off the electronic switch 16 and switching it on again, available for turning on the same, as described in connection with the European Patent Application 0 855 799.

The transistor T106 with the resistor R114 in this case form the switching-on stage, while the transistor T105 forms the switching-off stage, as likewise described in Patent Application 0 855 799.

The second control stage 50' is formed in the case of the second exemplary embodiment of the control circuit according to the invention by the resistor T100, the base of which is connected via the resistor R109 likewise to the control input 42', while the emitter E is connected directly to the feed voltage terminal 52' and the collector C is at ground via the series-connected resistors R105 and R106.

A center tap 82 between the resistors R105 and R106 is used for controlling the transistor T107, which is part of the second driver circuit 70'. The transistor T107 is connected with its collector C via a resistor R110 to the supply terminal 12 and has its emitter directly at ground, while the base B is connected directly to the center tap 82 between the resistors R105 and R106.

Furthermore, the base B of the transistor T107 is connected via a diode D101 to the center tap 18.

The switching signal S2 in this case lies at the center tap 84 between the transistor T107 and the resistor R110, this center tap 84 being connected via the control terminal 30 to the gate of the second electronic switch 20.

For the purpose of illustrating the function of the control circuit 32', the individual switching states at the signal output 36 are represented in FIG. 6 in their combination with the states occurring in the second exemplary embodiment of the control circuit according to the invention.

The "high" signal state at the signal output 36 accordingly leads to a "low" state at the control output 66' of the first control stage 46' and consequently also to a state of S1="low".

Furthermore, the "high" signal state leads to a "low" state at the control output 70' of the second control stage 50' and consequently to a state of S2="high" in the same way as in the case of the first exemplary embodiment, so that the center tap or phase terminal 18 is at ground.

In the same way, the "low" signal state leads to a "high" state at the control output 66' of the first control stage 46' and consequently once again to a state of S1="high", while the "low" signal state also leads to a "high" state at the control output 70' of the second control stage 50', which once again has the consequence that the switching signal S2 becomes="low" and consequently the half-bridge 10 switches the center tap 18 to the supply voltage UV.

Finally, the "tristate" state once again leads to a state of "low" at the control output 66', so that S2 likewise becomes="low", while the "high" state is present at the control output 70' of the second control stage 50', which leads to the switching signal S2 likewise becoming equal to "low" and consequently the half-bridge 10 being switched off.

In addition, the second exemplary embodiment of the control circuit according to the invention also has the advantage that, via the diode D101, the second electronic switch 20 is controlled into a definite freewheeling state via the driver circuit 72, that is to say whenever the voltage at the center tap 18 becomes negative. Consequently, the freewheeling current does not have to flow via the freewheeling diode F which is necessarily associated with the second electronic switch 20 and has a considerable internal resistance, but instead a compulsory freewheeling switching of the electronic switch 20 takes place, so that the internal resistance is lower and consequently a lower amount of heat is produced.

Moreover, in the same way as with the first control circuit, it is also the case with the second control circuit 52 that breaking down of the feed voltage US leads to the half-bridge 10 going over into the state of S1="low" and S2="high", that is to say the center tap 18 is connected to ground and consequently braking of the motor takes place if it is running.

In connection with the explanation so far of the individual exemplary embodiments, in particular of the control devices according to FIG. 1 and FIG. 2, it has been assumed that the motor M or electronically commutated motor DM is always operated at full speed.

However, with the solution according to the invention it is also possible, for example with the control device according to FIG. 1, to operate the DC motor M with reduced power in pulse-width modulation operation.

Figure 7:
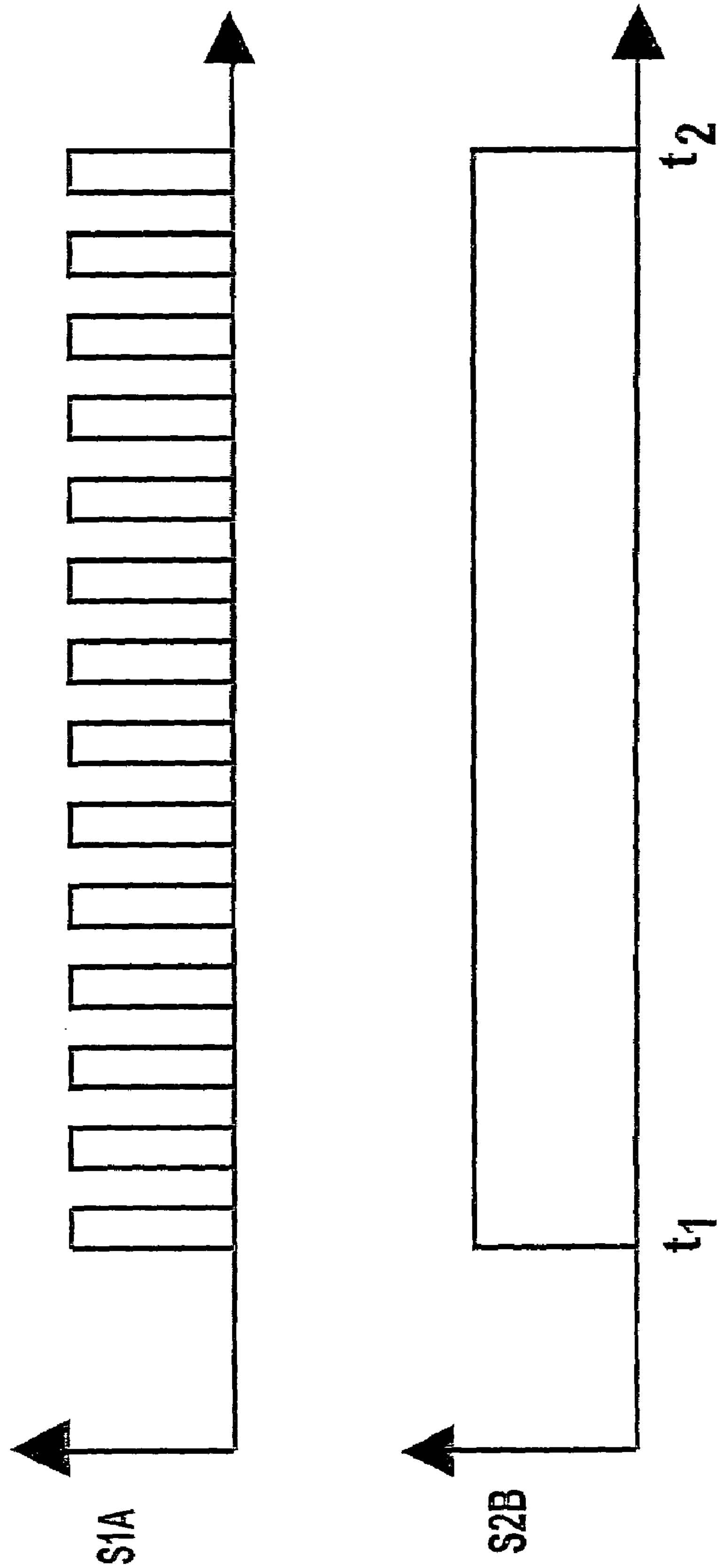

If, for example, the DC motor M is operated with clockwise rotation between the time period $t_1$ and $t_2$, the first electronic switch 16A of the first half-bridge 10A is operated with pulse-width-modulated switching signals S1A in the time from $t_1$ to $t_2$, as represented in FIG. 7.

On the other hand, the second electronic switch 20B of the second half-bridge 10B is not likewise controlled with pulse-width-modulated switching signals S2B in the time from $t_1$ to $t_2$, but instead is continuously switched on during this time, that is to say continuously opened, irrespective of whether the switching signal S1A is in the on state or off state.

This solution has the advantage that the processor 34 does not likewise have to emit at the signal output 36B a pulse-width-modulated signal state synchronized with the pulse-width-modulated signal at the signal output 36A, but instead carries during the same time period the signal state which leads to a continuous "high" signal for the second electronic switch 20B of the second half-bridge 10B, which leaves the second electronic switch 20B switched on from the time period $t_1$ to the time period $t_2$.

What is claimed is:

1. A control circuit, processor and half-bridge combination for use in operating electric motors, said half-bridge including a first electronic switch lying between a supply voltage and a phase tap, and a second electronic switch lying between the phase tap and ground, said control circuit being adapted to control the first and second electronic switches with one out of only three switching signal pairings, said signal pairings comprising (i) said first switch being on and said second switch being off, (ii) said first switch being off and said second switch being on, and (iii) said first and second switches being off, and said processor having a said processor having a single signal output port coupled to control said control circuit to select one of said three signal pairings, via one of three possible output signals at said signal output port.

2. A combination according to claim 1, wherein the processor is adapted to generate at said signal output port either a "high" signal state, a "low" signal state, or a "tristate" signal state with a floating potential between said high and low signal states.

3. A combination according to claim 2, wherein the signal output port of the processor connected to the control circuit is either at a feed voltage of the control circuit or at ground, or allows free potential setting.

4. A combination according to claim 1, wherein for defining the only three switching signal pairings, the control circuit comprises a stage that is not freely programmable.

5. A combination according to claim 4, wherein said stage has hard-wired components.

6. A combination according to claim 4, wherein said stage establishes fixed associations between the switching signal pairings and switching states at the signal output port.

7. A combination according to claim 6, wherein said stage has hard-wired components.

8. A combination according to claim 1, wherein the control circuit has two complementary stages which are controllable via the signal output port.

9. A combination according to claim 8, wherein inputs of the complementary stages are connected to the signal output port via like-valued resistors.

10. A combination according to claim 1, wherein the control circuit includes a driver circuit for each of the electronic switches.

11. A combination according to claim 1, wherein in the event a feed voltage at the processor breaks down, the control circuit produces the switching signal pairing in which the first switch is switched off and the second switch is switched on.

12. A combination according to claim 1, wherein when a "tristate" signal state is present at the signal output port of the processor, the first and second switches are switched off.

13. A combination according to claim 12, wherein if the "tristate" signal state is present at the signal output port of the processor, the potential at said output port will float between "high" and "low" signal states.

14. A combination according to claim 1, wherein:

the control circuit includes a driver circuit for each of the electronic switches, and the driver circuit for the second electronic switch is capable of automatically switching the second electronic switch into a freewheeling state in response to the inductance of a load coupled to the switch and the switching off of the first electronic switch.

15. A control device for a load fed via phase taps of at least two half-bridges, each of the half-bridges being controllable with a control of its own, each control comprising:

a first electronic switch, lying between a supply voltage and a phase tap, a second electronic switch, lying between the phase tap and ground, and a control circuit, which controls said first and second electronic switches of the half-bridge, with one out of only three switching signal pairings for the two electronic switches, said signal pairings comprising (i) said first switch being on and said second switch being off, (ii) said first switch being off and said second switch being on, and (iii) said first and second switches being off, and said control device comprising:

a processor having a respective single signal output port coupled to control each of said respective controls via the respective control circuit of each control to select one of said three switching signal pairings, via one of three possible output signals at said respective single signal output port.

16. A control device according to claim 15, wherein the half-bridges are controllable in their power by pulse-width modulation operation of at least one of the electronic switches of the half-bridges respectively to be switched on.

17. A control device according to claim 16, wherein during said pulse-width modulation operation, the first electronic switch of one of the half-bridges can be operated using pulse-width modulation and a corresponding second electronic switch of another half-bridge is constantly turned on.

* * * * *